United States Patent [19]

Dieter et al.

[11] Patent Number: 4,764,922
[45] Date of Patent: Aug. 16, 1988

[54] DATA TERMINAL INTERFACE CIRCUIT TO A TELEPHONE TRANSMISSION LINE

[75] Inventors: Georg Dieter, Egling; Johann Hieninger, Munich, both of Fed. Rep. of Germany

[73] Assignee: Siemens Aktiengesellschaft, Berlin and Munich, Fed. Rep. of Germany

[21] Appl. No.: 897,435

[22] Filed: Aug. 18, 1986

[30] Foreign Application Priority Data

Aug. 21, 1985 [DE] Fed. Rep. of Germany ....... 3529939

[51] Int. Cl.$^4$ ............................................. H04B 1/50
[52] U.S. Cl. .................................. 370/123; 370/69.1; 379/93; 379/443; 333/24 R; 333/131
[58] Field of Search .................... 370/76, 123, 69.1; 379/98, 93, 443; 333/1, 24 C, 24 R, 119, 131

[56] References Cited

U.S. PATENT DOCUMENTS

| | | |
|---|---|---|
| 4,443,662 | 4/1984 | Nakhla . |
| 4,456,985 | 6/1984 | Carsten et al. ...................... 370/123 |
| 4,456,986 | 6/1984 | Carsten et al. ...................... 370/123 |

FOREIGN PATENT DOCUMENTS 0062442 10/1982 European Pat. Off. .
0146894 7/1985 European Pat. Off. .

*Primary Examiner*—Douglas W. Olms
*Assistant Examiner*—Melvin Marcelo
*Attorney, Agent, or Firm*—Adel A. Ahmed; Thomas H. Jackson

[57] ABSTRACT

At a transmission line (La', Lb') connected with telephone station equipment (Tel) via a lowpass filter (TP), via which telephone station signals are transmitted in a first frequency range, there is connected via a line transformer (U3) a data terminal (DG) which is able to receive and to send data signals in a second frequency range above the first frequency range. On its side toward the transmission line (La', Lb'), the lowpass filter (TP) has a capacitive termination (C7) which is rated so that its a-c resistance is in the order of magnitude of or preferably less than the characteristic impedance of the data transmission line in the second frequency range.

6 Claims, 1 Drawing Sheet

DATA TERMINAL INTERFACE CIRCUIT TO A TELEPHONE TRANSMISSION LINE

BACKGROUND OF THE INVENTION

1. Technical Field

The invention relates to the field of data terminal interface circuits for telephone transmission lines.

2. Description of the Prior Art

Circuit arrangements for interfacing data terminals with transmission lines connected with telephone equipment are known already from European Patent No. A2-0 146 894. In these known circuit arrangements, the data terminals with their data signal transmitting and receiving components are connected to telephone lines either via bandpass filters or via separate switching devices or respectively multiplexers and demultiplexers. In either case, therefore, the circuitry cost connected with providing such circuits is relatively high.

Further, circuit arrangements for connecting data signal transmitting and receiving data terminals to transmission lines connected with telephone equipment are known from Europoean Patent No. A2-0 062 442 and from U.S. Pat. 4,443,662 which comprise a filter having a predetermined passband for coupling signals in the passband into or out of the respective transmission lines. Further the known circuit arrangements comprise a transformer with at least one first and at least one second winding. The filter includes a parallel connected capacitor connected to the transmission line via the at least one second winding. Connected in series with the at least first winding of the respective transformer is an inductor which forms with the capacitor, as imaged by the transformer, a series resonant circuit with a predetermined resonance frequency outside the pass band, signals being coupled in or out of the two-wire line essentially at the predetermined resonance frequency via the inductor and the transformer. This means that, in these known circuit arrangements, a series resonance circuit is formed for each data terminal and specifically even for each coupling-in and coupling-out direction. In all, therefore, the cost of circuitry is relatively high here also. It is the object of the invention to develop a circuit arrangement for interfacing a data terminal and a telecommunications line in such a way that the cost of circuitry is lower than in the previously known circuit arrangements and that at the same time one can operate with a relatively low signal attenuation in the individual signal transmission paths.

SUMMARY OF THE INVENTION

The above sketched problems are solved by the measures described below. The invention offers the advantage that at a relatively low total cost of circuitry it is ensured that the signal attenuation in the transmission line is very low. Thus a circuit arrangement according to the invention can be realized where the signal attenuation in the transmission line is, for example, only 0.01 dB, whereas by comparison, in the conventional circuit arrangements equipped with parallel lowpass or highpass or bandpass filters for signal separation, a value of 0.33 dB can only be obtained as a mean.

Appropriately, the line transformer of the present invention is designed as a symmetrical line transformer. This brings with it the advantage of an especially simple circuit construction with respect to a symmetrical line load.

Preferably the line transformer is designed as a part of a hybrid circuit, to which are connected a data signal transmitter and a data signal receiver of the data terminal. This results in the advantage of relatively low cost of circuitry for interference-free operation of the data transceiver of the data terminal.

According to an appropriate development of the invention, an inductor may be connected in series with at least a part of the capacitive termination of the lowpass filter. This measure may be made use of to advantage if the output impedance of the lowpass filter is to be further reduced to obtain improved data transmission.

Preferably said inductor is connected in parallel with an ohmic resistance arrangement. This results in the advantage that the series resonant circuit consisting of said inductor and the capacitive termination can provide the desired bandwidth.

Another appropriate development of the present invention consists in that the line transformer winding connected to the respective transmission line wire is connected in parallel with a series resonant circuit which is tuned to a frequency at which occur special signals to be transmitted to or from the telephone equipment. This measure will be made use of to advantage when, for example, besides the telephone signals, 16 kHz fee counting signals are to be transmitted to or from the telephone equipment.

The invention will be explained more specifically below with reference to drawings by way of an exemplary embodiment.

DETAILED DESCRIPTION

Let it be noted that the points provided throughout the drawings at the individual windings of the transformers indicate the winding direction of the respective winding.

Figure 1:
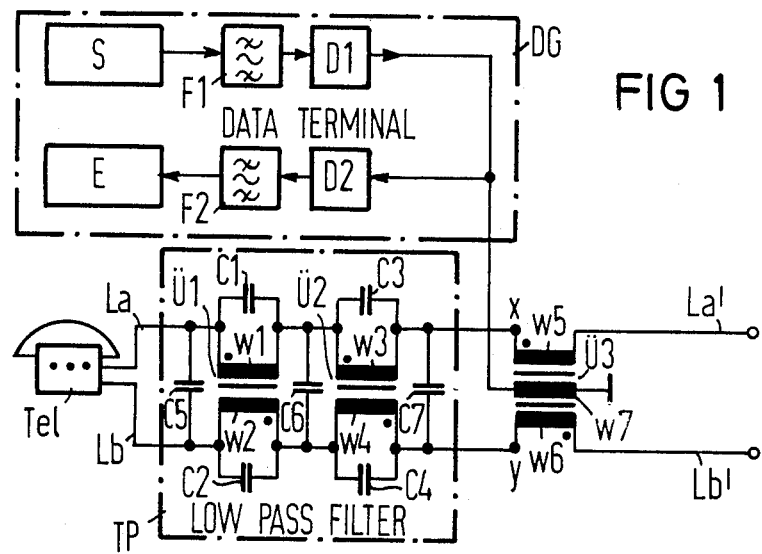
FIG. 1 shows in a block diagram a circuit arrangement according to the invention.

FIG. 1 shows in a block diagram a circuit arrangement according to the invention. This circuit arrangement includes telephone station equipment Tel, which may be a conventional telephone set and a data terminal DG, which is able to send and to receive data signals.

The telephone equipment Tel is connected via the wires La, Lb of a connecting transmission line to a lowpass filter TP which, in a manner to be described more fully below, is connected to the wires La', Lb' of a transmission line. The lowpass filter TP comprises two transformers U1 and U2, constructed as a coil with a single core, each comprising two windings w1, w2 and w3, w4, respectively, the partial windings of which are connected directly with one another, namely the windings w1, w3 and the windings w2, w4. Connected respectively in parallel with the windings w1 to w4 is one capacitor each of the capacitors C1, C2, C3, C4. On the side facing the telephone equipment, the lowpass filter TP comprises a capacitor C5 lying between the two line wires La, Lb, which, although shown here, may even be dispensed with. Between the connections of the windings w1, w3 and w2, w4, a capacitor C6 is provided. On the side facing the transmission line wires La', Lb', the lowpass filter TP has a capacitor C7 which must be regarded—considered from the telephone equipment Tel—as a capacitive termination of the lowpass filter TP.

Inserted in the two transmission line wires La', Lb' is a line transformer U3 with two windings w5, w6 which is formed symmetrically according to FIG. 1 and designed as a coil with a single core. The line transformer U3 further comprises a transformer winding w7, one end of which is at a defined potential, such as ground potential, and the other end of which is connected to the data terminal DG.

The data terminal DG comprises in the present case a data signal transmitter S and a data signal receiver E. On the output side, the data signal transmitter S is connected to the winding end of the transformer winding w7 via a filter F1, which may be a bandpass filter, and possibly via an attenuation device D1, which may be adjustable. The data signal receiver E is connected on the input side to the just mentioned winding end of the transformer winding w7 via a filter arrangement F2, which may be a bandpass filter, and possibly via an attenuation device D2, which may also be adjustable. The two filters or filter arrangements F1, F2 are designed so that their pass bands, lying in different frequency ranges, lie above the pass band of the low pass filter TP. This means that the transmission of the telephone signals occurs via the lowpass filter TP in a first frequency range of, for example, 0.3 to 3.4 kHz, and the data signal transmission occurs in a second, upper frequency range of, for example, 50 to 100 kHz. If the data terminal DG is a modem, the arrangement is often referred to as a Data-Over-Voice Modem.

In the circuit arrangement considered above and illustrated in FIG. 1, the lowpass filter TP with its capacitive termination formed by the capacitor C7 is preferably rated so that its a-c resistance is lower than the characteristic impedance of the data terminal DG in the second frequency band or upper frequency range. It should be noted here that the a-c resistance of the capacitive termination may alternately be rated so that it is in the order of magnitude of the just mentioned characteristic impedance. Considering further that the data terminal DG is or is to be adapted on its input side and on its output side to the characteristic impedance of the transmission line La', Lb' for the transmission of data signals in the same manner as the telephone equipment Tel or respectively the lowpass filter TP to the characteristic impedance of the respective transmission line for the transmission of telephone signals, it results that the data signals, which arrive at the capacitor C7 via the windings w5, w6 can be transmitted to or away from the data terminal DG practically without any appreciable attenuation. With respect to the telephone signals, the situation is actually so that there is in series with the lowpass filter TP the line transformer U3; however, the resistance conditions may here be regarded as still relatively favorable, so that the telephone signals are again practically hardly attenuated. The following values may be regarded as the usual values for the mentioned characteristic impedances or respective input and output a-c resistances of the equipments. The characteristic impedance of the transmission line La', Lb' for transmission of telephone signals is 600 ohms; the characteristic impedance of the respective transmission line La', Lb' for transmission of data signals in the considered second frequency band or high frequency range is 150 ohms.

Figure 2:
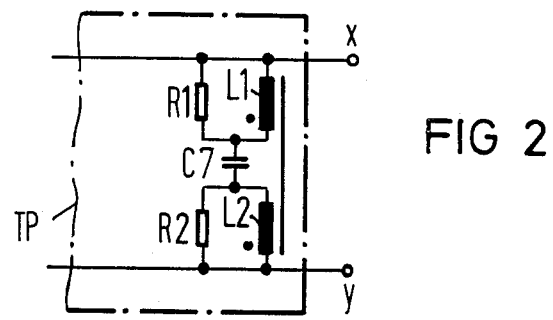
FIG. 2 shows in detail a modification of the circuit arrangement according to the invention illustrated in FIG. 1.

In FIG. 2, a modification of the lowpass filter TP illustrated in FIG. 1 is indicated. The circuit points x and y indicated in the right portion of FIG. 2 are identical with the circuit points x, y similarly marked in FIG. 1. As is evident from FIG. 2, in series with the capacitor C7 is an inductor consisting of two coils L1, L2, whose inductance together with the capacitance of capacitor C7 establishes a series resonant frequency which is established by design in the center of the data transmission frequency range, and through which a sufficiently low output impedance of the lowpass filter shown in FIG. 2 is achieved. Through the resistors R1, R2 connected in parallel with the coils L1, L2 a desired bandwidth for the considered series resonant circuit can be achieved.

Figure 3:
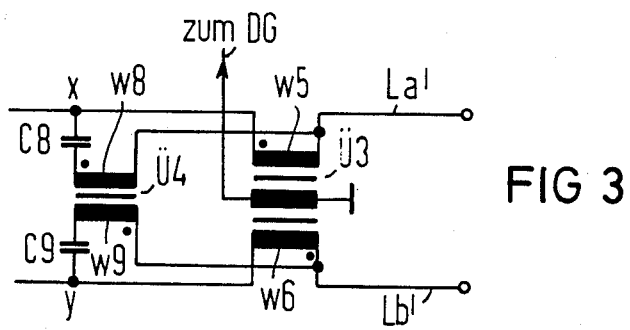
FIG. 3 shows a further modification of the circuit arrangment according to the invention illustrated in FIG. 1.

In FIG. 3 is shown an additional modification of the circuit arrangement illustrated in FIG. 1. According to FIG. 3, the windings w5, w6 of the line transformer U3 are in parallel with series resonant circuits consisting of the windings w8, w9 of an additional transformer U4 designed as a coil with a single core, and capacitors C8, C9. These series resonant lie between the line transmission wires La', Lb' and the circuit points x, y. The respective series resonant circuits are rated so that they are in resonance at certain frequencies which are to be transmitted from or to the telephone equipment Tel per FIG. 1, as for example 16 kHz fee counting signals. Thus, due to the mentioned series resonant circuits, the mentioned special signals can be transmitted to or from the telephone equipment Tel at still lower attenuation than in the circuit arrangement shown in FIG. 1. At the same time, an increase of the stop band attenuation in the data signal channel is achieved for the mentioned special signals by the respective series resonant circuits.

Thus there has been shown and described several embodiments of an advantageous data terminal interface arrangement where the data terminal transmits and receives at considerably higher frequencies than normal telephone subscriber transmission. The arrangements meet all the advantages sought and the invention should only be considered to be limited in scope by the claims which follow.

What is claimed is:

1. A circuit arrangement for connecting a data terminal for sending and/or receiving data signals to a transmission line connected to telephone equipment, via which line, telephone signals are transmitted in a first frequency range and data signals in a second higher frequency range, and to which the telephone equipment and the data terminal are connected via a filter arrangement, which includes a lowpass filter lying in the transmission, the transmission line having a first, relatively high characteristic impedance for the transmission of the telephone signals and a lower, second characteristic impedance for the transmission of the data signals, the lowpass filter being designed so that on the side connected with the transmission line which is opposite the side connected with the telephone equipment, there is provided a capacitive termination and, in the transmission line, a line transformer which comprises at least one transformer winding for coupling with the data terminal as a coupling winding, characterized in that the line transformer (U3) is connected by its respective coupling winding (w7) directly with the data terminal (DG), and the capacitive termination (C7) of the lowpass filter (TP)

is rated so that its a-c resistance in said second frequency range is at most in the order of magnitude of the characteristic impedance of the transmission line for that frequency range but is preferably lower than this characteristic impedance.

2. A circuit arrangement according to claim 1, further characterized in that the line transformer (U3) is designed as a symmetrical line transformer (U3).

3. A circuit arrangement according to claim 1, further characterized in that the line transformer (U3) comprises a part of a 2 wire to 4 wire hybrid circuit to which a data signal transmitter (S) and a data signal receiver (E) of the data terminal (DG) are connected to the 4 wire side.

4. A circuit arrangement according to claim 1, further characterized in that at least one inductor (L1, L2) is connected in series with at least one terminal of the capacitive termination (C7) of the lowpass filter (TP).

5. A circuit arrangement according to claim 4, further characterized in that at least one ohmic resistance arrangement (R1, R2) is connected in parallel with the at least one inductor (L1, L2).

6. A circuit arrangement according to claim 1, further characterized in that the winding (w5, w6) of the line transformer (U3) connected to respective transmission line wires (La', Lb') of the transmission line is connected in parallel with a series resonant circuit (w8, C8; w9, C9) which is tuned to a particular frequency at which frequency special signals to be transmitted to the telephone equipment (Tel) occur.

* * * * *